(12) United States Patent
Basson et al.

(10) Patent No.: US 7,792,701 B2
(45) Date of Patent: Sep. 7, 2010

(54) METHOD AND COMPUTER PROGRAM PRODUCT FOR PROVIDING ACCESSIBILITY SERVICES ON DEMAND

(75) Inventors: Sara H. Basson, White Plains, NY (US); Peter G. Fairweather, Yorktown Heights, NY (US); Alexander Faisman, Croton-on-Hudson, NY (US); Dimitri Kanevsky, Ossining, NY (US); Bradley L. Westpfahl, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 1973 days.

(21) Appl. No.: 10/779,376

(22) Filed: Feb. 13, 2004

(65) Prior Publication Data

US 2005/0183109 A1     Aug. 18, 2005

(51) Int. Cl.
*G06Q 30/00*     (2006.01)
(52) U.S. Cl. .................... 705/26; 705/1; 705/27
(58) Field of Classification Search ............. 705/26, 705/27, 1, 37
See application file for complete search history.

(56) References Cited

U.S. PATENT DOCUMENTS

| | | |
|---|---|---|
| 6,238,337 B1 | 5/2001 | Kambhatla et al. |
| 6,243,676 B1 | 6/2001 | Witteman |
| 6,300,947 B1 | 10/2001 | Kanevsky et al. |
| 6,321,212 B1 | 11/2001 | Lange |
| 6,424,935 B1 | 7/2002 | Taylor |
| 6,473,778 B1 | 10/2002 | Gibbon |
| 6,505,208 B1 | 1/2003 | Kanevsky et al. |
| 6,537,072 B2 | 3/2003 | Kanevsky et al. |
| 6,540,674 B2 | 4/2003 | Zadrozny et al. |
| 6,594,346 B2 | 7/2003 | Engelke |
| 6,618,704 B2 | 9/2003 | Kanevsky et al. |
| 6,658,642 B1 | 12/2003 | Megiddo et al. |

(Continued)

FOREIGN PATENT DOCUMENTS

EP     1096409 A1     5/2001

(Continued)

OTHER PUBLICATIONS

"Evaluation and Enhancement of Web Content Accessibility for Persons with Disabilities". Xiaoming Zeng. University of Pittsburgh, 2004. Retrieved via Proquest on Mar. 13, 2010.*

(Continued)

*Primary Examiner*—Jeffrey A. Smith
*Assistant Examiner*—Michael A. Misiaszek
(74) *Attorney, Agent, or Firm*—Law Office of Charles W. Peterson, Jr.; John R. Pivnichny

(57) ABSTRACT

An accessibility service tool providing accessibility services on demand for converting between content types and program product therefore. Media input, e.g., audio or audio/video is provided to a transformation and augmentation unit that determines from the media content what type of conversion is required and what service is being requested. An auction manager negotiates with service providers and selects one or more service provider for converting the input content into accessible content that is provided instead of or with the original content. Content conversion may be automatic or manual. Manual conversion may be used in background training for automatic conversion.

16 Claims, 5 Drawing Sheets

U.S. PATENT DOCUMENTS

| | | | |
|---|---|---|---|
| 6,714,963 B1* | 3/2004 | Levine et al. | 709/203 |
| 6,981,246 B2* | 12/2005 | Dunn | 717/127 |
| 7,266,430 B2 | 9/2007 | Basson et al. | |
| 2001/0042002 A1 | 11/2001 | Koopersmith | |
| 2002/0138616 A1* | 9/2002 | Basson et al. | 709/225 |
| 2002/0158903 A1* | 10/2002 | Janakiraman et al. | 345/746 |
| 2003/0125099 A1 | 7/2003 | Basson et al. | |
| 2003/0153338 A1 | 8/2003 | Herz et al. | |
| 2003/0158644 A1 | 8/2003 | Basson et al. | |
| 2004/0218451 A1* | 11/2004 | Said et al. | 365/222 |

FOREIGN PATENT DOCUMENTS

| | | |
|---|---|---|
| WO | WO9810381 | 3/1998 |
| WO | WO01/37153 A1 | 5/2001 |

OTHER PUBLICATIONS

W3C, Web Accessibility Initiative (WAI), Nov. 6, 2003.
W3C, World Wide Web Consortium (W3C) Launches International Web Accessibility Initiative, Apr. 7, 1997.

* cited by examiner

METHOD AND COMPUTER PROGRAM PRODUCT FOR PROVIDING ACCESSIBILITY SERVICES ON DEMAND

BACKGROUND OF THE INVENTION

1. Field of the Invention

The present invention is related to on-demand accessibility services and more particularly to an accessibility tool that provides accessibility services on the fly and cost efficiently tailored to the specific situation and to the needs of the particular individual availing herself or himself of the accessibility services.

2. Background Description

The World Wide Web Consortium (W3C) launched the Web Accessibility Initiative (WAI) to promote and achieve Web functionality for people with disabilities on Apr. 7, 1997. See, www.w3.org/Press/WAI-Launch.html. In acknowledging the importance of making the Web usable by anyone, regardless of individual capabilities and disabilities, Tim Berners-Lee, Director of the W3C and inventor of the World Wide Web affirmed the commitment of the W3C "to removing accessibility barriers for all people with disabilities—including the deaf, blind, physically challenged, and cognitive or visually impaired." Id. Recognizing the need for making Web access available to all regardless of disability, W3C instituted WAI "in coordination with organizations around the world, (to pursue) accessibility of the Web through five primary areas of work: technology, guidelines, tools, education and outreach, and research and development." See, www.w3.org/WAI. Thus, Web site content increasingly is being provided in multiple forms or formats to achieve these accessibility goals.

Unfortunately, especially for pre-existing content, conversion costs have proven to be prohibitive, making it difficult for most service providers to convert content so as to make suitably accessible services available. In particular, it may be very difficult to justify converting large volumes of archived data, much of which may have very limited use and never be used in one form or another. For example, a company may have thousands of hours of available audio material that may be accessed over the company's Web site. However, transcribing all of that available audio material, e.g., for people with hearing impairment, would be very expensive. There is a chance that hearing impaired persons will not look at much of the transcribed materials. Similarly, some material with graphic content may seldom, if ever, be visited by persons with visual impairment. However, Web sites may contain descriptions that are not very thorough, requiring a visually impaired person to sift through mountains of material just to find that a particular site or material is not of interest. Again, converting web pages that are specially designed to be accessible by visually impaired is a very expensive proposition, especially given the possibility that a visually impaired person may never look at a given site. Similarly, others with different disabilities may qualify for On-Demand Accessibility Services.

For example, a teacher or professor giving a lecture may place reading materials on the Internet, make on-line reading assignments or make material available for a distance learning course. Normally, this is done without considering that learning disable students may be unable to access the on-line materials appropriately, e.g., read and understand the text. Again, it may be very difficult to anticipate how to prepare educational materials for students taking into account all of the many learning disabilities. Further, the preparation effort may be unnecessary since it is unlikely that the students include persons with all of those learning disabilities.

Meetings pose another problem. Typically, a stenographer or sign language interpreters must be employed to provide real-time transcription during for hearing impaired attendees. It is very difficult to provide transcription services or have sign language interpreters available all of the time, even if the transcription is done remotely, e.g., by telephone. Speech recognition has limited accuracy and so, does not entirely solve this problem either, regardless of whether it is provided over the phone or directly at the meeting, e.g., with a microphone. Further, the most effective transcription service may depend upon the circumstances of the particular meeting, class, etc. For example, a relay service may employ an inexperienced writer to assist in transcribing a meeting; meeting transcriptions may by necessity be done by stenographers; an acoustic model may be on file for a particular speaker and, therefore, speech recognition software may suffice for transcription; or, a meeting may be transcribed with a PDA digitizer or cellular telephone that can compress the audio (to maintain audio quality) and send the compressed audio to a server for speech recognition transcription, which receives and decodes the compressed audio with a high degree of accuracy.

Thus, there is a need for an accessibility tool that provides accessibility services on the fly and cost efficiently tailored to the specific situation and to the needs of the particular individual availing herself or himself of the accessibility services.

SUMMARY OF THE INVENTION

It is a purpose of the invention to remove accessibility barriers for all people with disabilities;

It is another purpose of the invention to remove accessibility barriers for the deaf, blind, physically challenged, and cognitive and visually impaired;

It is yet another purpose of the invention to make Web content usable by anyone, regardless of individual capabilities and disabilities;

It is yet another purpose of the invention to optimize the transcription of audio materials by recognizing when there is a legitimate requirement for transcription.

The present invention relates to an accessibility service tool providing accessibility services on demand for converting between content types and program product therefore. Media input, e.g., audio or audio/video is provided to a transformation and augmentation unit that determines from the media content what type of conversion is required and what service is being requested. An auction manager negotiates with service providers and selects one or more service provider for converting the input content into accessible content that is provided instead of or with the original content. Content conversion may be automatic or manual and manual conversion may be used in background training for automatic conversion.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
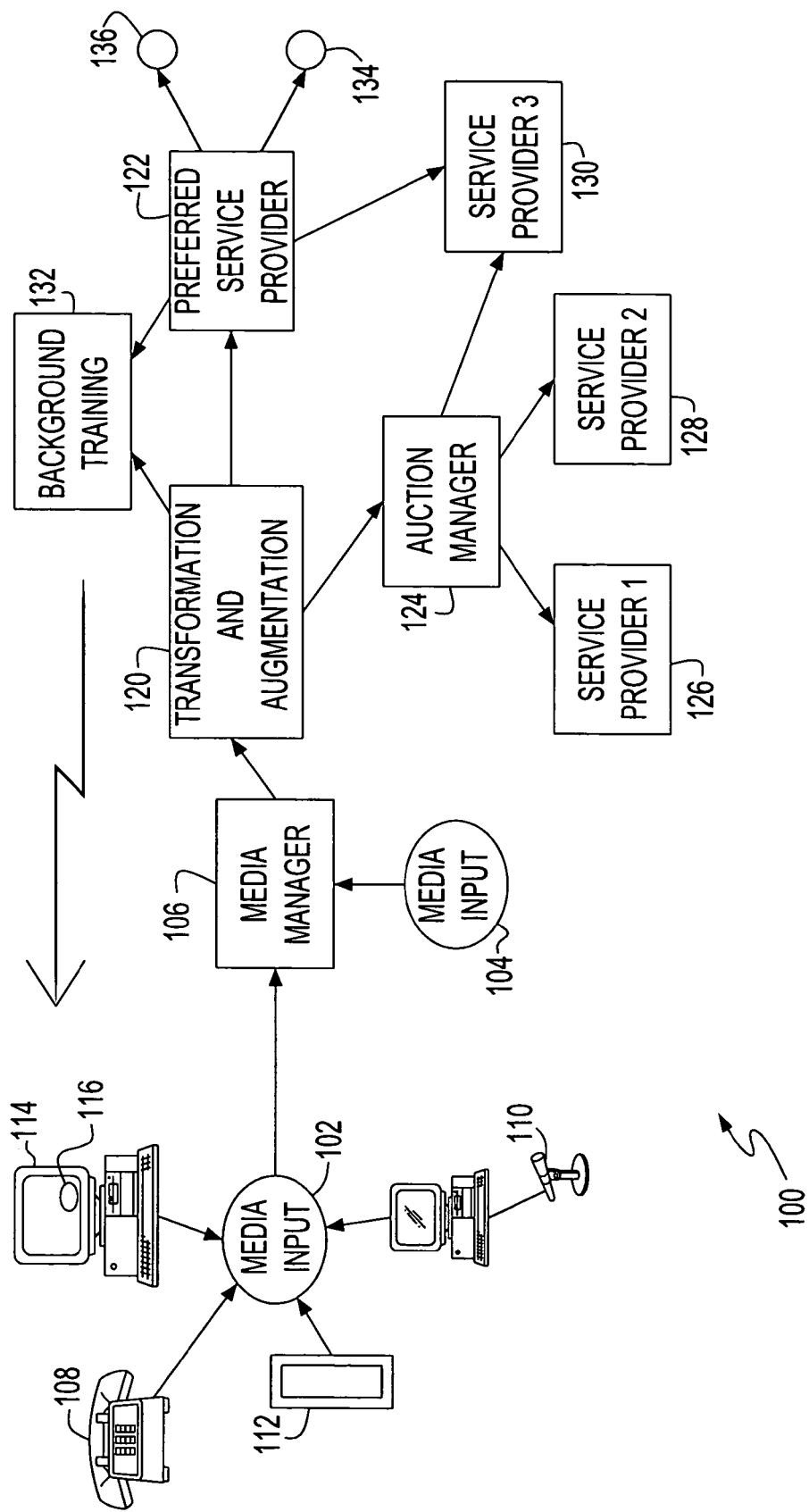
FIG. 1 shows an example of a preferred On-Demand Accessibility Service tool that focuses on rapidly providing accessibility services, when and as, they are specifically required.

Turning now to the drawings, and, more particularly, FIG. 1 shows an example of a preferred On-Demand Accessibility Service tool 100 according to the present invention, that focuses on rapidly providing accessibility services for converting between content types, e.g., from audio to text or from video to spoken text, when and as they are specifically required. Guidelines/standards are provided for webcast content creators to guide in creating content that is automatically convertible to accessible content. By following these guidelines/standards webcast content creators are guided in locating microphones, for example, to provide audio content that is automatically transcribable. Thus, resulting such content is of suitable quality for automatic speech recognition. For example, websites containing audio that is not transcribed may include a "Caption Me Now" button or link. Clicking the button activates speech recognition, e.g., on a remote server, to create a transcript of the spoken words that is re-integrated with the website content, e.g., as closed captioning for streaming video. If speech recognition is requested, audio content can be evaluated by an audio quality analyzer (e.g., an automatic tool or a person) for suitability for automatic or semi-automatic speech recognition or for human transcription. Based on the analysis, the audio quality analyzer selects suitable transcription and routes the audio content accordingly. The audio quality analyzer routes content created according to the guidelines/standards to automatic speech recognition for transcription.

So, content is provided to media input modules 102, 104 which selectively present media input to a media manager 106. Selectable content may include graphics, video information, biometric information and/or audio. In this example of FIG. 1, audio input may be provided as analog audio input from a telephone 108, spoken word from a computer microphone 110, compressed audio from a PDA 112 or, audio from a multimedia Web based presentation on a computer 114. In the Web based content example, conversion is selected by an accessibility button icon 116, e.g., a "Caption Me Now" button to initiate captioning on demand. The media manager 106 types the media input and forwards typed media input to transformation and augmentation unit 120. The transformation and augmentation unit 120 examines incoming media input and, depending upon the results of that examination, forwards the particular media input: to a preferred service provider 122; to an auction manager 124 for selection and distribution to a service provider 126, 128, 130; and/or, to background training 132, e.g., for a new user. The preferred service provider 122 may further distribute one or all of the media input components to selected providers 130, 134, 136, e.g., subcontractors or automatic conversion. Essentially, for audio transcription, the service providers 122, 126, 128, 130, 134 and 136, transcribe the audio, synchronize the transcription with the audio, and re-integrate the audio and transcription into the appropriate multimedia format for the customer; and, the auction manager 124 finds the most cost effective solution for completion when it is required.

So, when the Caption Me Now icon is selected, the media manager 106 determines the type of information in the media input, e.g., audio, graphic, and etc. From that determination, the media manager 106 forwards the media input to the transformation and augmentation unit 120, which sends/receives requests and conditions for a service. In particular, the transformation and augmentation unit 120 qualifies the exact characteristics of the content, determines what is the desired service to be provided, and decides whether the content is of sufficient quality to forward it to the auction manager 124. The auction manager 124 evaluates the content, identifies the methods by which the services are to be provided, e.g., stenographer, ASR, etc., and sends a request for service/bid to the service providers 130, 134, 136. The service providers 130, 134, 136 evaluate the request and, any that decide to participate, return a bid with any provisional variances. Once bids are received from the service providers 130, 134, 136, the auction manager 124 selects the lowest bidder to provide the requested service and provides the winning bidder with access to the data. After the winning bidder completes the particular task, the auction manager 124 delivers the requested material (e.g., as a transcribed audio file) back to the initial user.

A customer may pay for these services over a web-site, e.g., with a regular monthly sum or on a per use basis, e.g., $10 or each request. So, if a user requests that a certain web-site be made accessible for visual or hearing impaired persons, then a charge is debited against the pool of money collected from all of the web sites. For example, if 1000 web sites subscribe with $10 to the On-Demand Accessibility Service, then the service has $10,000 with which to work for each request or accessibility from one of the web sites. Optionally, the service may be insured against the possibility that the number or cost of requests exceeds the total pool from subscribing web sites. As described hereinbelow, the pooled money account may be connected through the auction manger 124 to the transformation and augmentation unit 120.

The transformation and augmentation unit 120 sends service requests to a preferred service provider 122 whenever it is determined that only the particular preferred service provider 122 can provide a certain service necessary for the conversion, e.g., because the preferred service provider 122 is bonded or has a necessary security clearance. The preferred service providers 122 may resort to their select providers 130, 136, 138. In addition, the preferred service providers 122 may use background training 132 to train and, subsequently, automatically provide the particular service.

So, for example, web-sites containing untranscribed audio may include an accessibility button 116. A hearing impaired user may like a transcription of the audio content, which is made available by selecting the accessibility button 116. The request for transcription is forwarded over the Internet and the user may indicate with the request, how quickly the information is required. If a transcription is urgently required and cost is no object, the request and audio content may be forwarded to a real-time stenographer. If the user is willing to wait several hours for the transcription, then the audio content may be sent to a separate location for transcription by cheaper methods e.g., a less experienced typist or, by speech recognition technology. If speech recognition is used, the results may be sent to an editor for clean up.

As noted hereinabove, to minimize transcription costs, the auction manager 124 manages accessibility conversion (e.g., transcription) through an auction-like structure, distributing a request for bids to select providers 130, 136, 138. For example, the auction manager 124 may forward a message indicating the audio content that is to be transcribed, the target completion date and any other conditions that may apply to the particular job. Each prospective service provider 130, 136, 138 may respond by submitting a bid from which, the auction manager 124 may select the service provider 130, 136, 138 with the lowest bid to provide the conversion.

The auction-like structure may include a distribution system (i.e., transformation and augmentation unit 120 and auction manager 124) that identifies the options that may be utilized to provide the service. For example, the request may be sent directly to a stenographer with the understanding that it cost a certain sum of money. Alternately, the request may be sent to a high accuracy speech recognition program, perhaps the cheapest available option. Further, depending upon the speech recognition program accuracy, after recognition the transcribed text may be forwarded to the cheapest available editor. Thus, the distribution system has a robust range of options from which to select in order to arrive at the cheapest and most efficient conversion path.

In another example, a visually impaired user may need audio content to use a web-site, e.g., spoken text, audio captioning describing a graphic or, audio with an in depth description of the web-page content. The user may request audio by selecting the accessibility button 116 to initiate conversion using either manual services (e.g., by a remote operator reading and/or describing the page content), or using automatic conversion services providing description of page content. An automatic conversion provider may be, for example, a speech synthesizer converting the web-page content to spoken word and assisting in maneuvering among web pages without involving another person, e.g., by tone responses to mouse movements. Similarly, in this example, the user's request is forwarded media manager 106, which in turn, types the content (e.g., audio, video or text) and relays it to the transformation and augmentation manager 120. If the conversion is to be auctioned, it is passed to the auction manager 124, which selects appropriate service provider 130, 136, 138. A manual conversion service provider may be selected for a detailed explanation, reading, or description of the web page content or, alternatively, an automatic provider (software) capable of providing a brief explanation, reading, or description of the web page content. The selected service provider sends the visually impaired user converted content in the form of a reading, an explanation or a web page description as previously requested.

In yet another example, learning disabled users may be unable to comprehend something in text, e.g., in the context of an educational course. Again, the user may request assistance in comprehension of the unclear materials from the course website, e.g., request that the text be clarified. Similarly, in this example, the user's request is forwarded media manager 106, which in turn, types its content and relays it to the transformation and augmentation manager 120. If the conversion is to be auctioned, it is passed to the auction manager 124, which selects appropriate service provider 130, 136, 138 that will accommodate the request to simplify the text and for the cheapest price.

Figure 2:
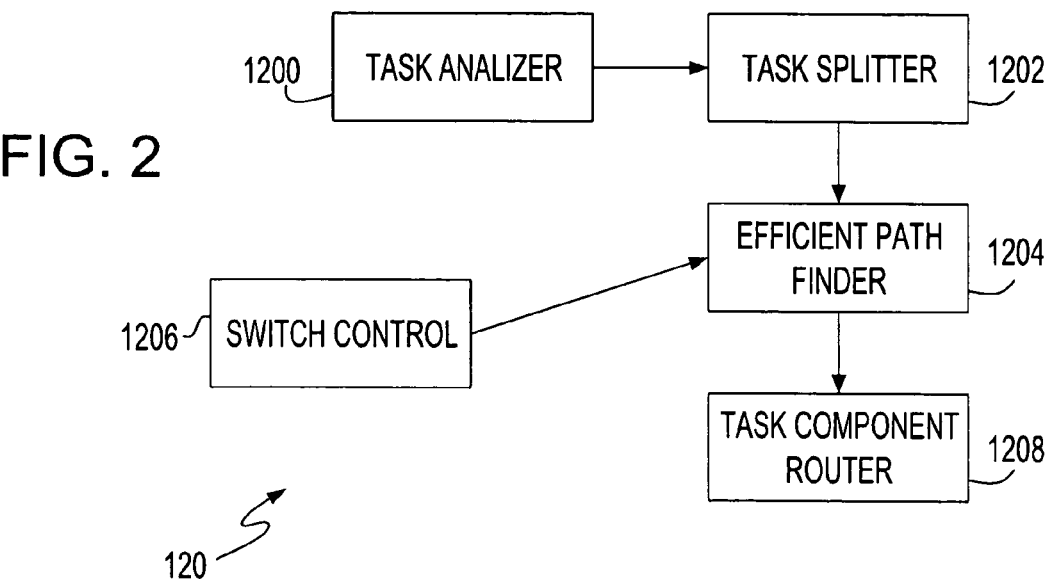
FIG. 2 shows an example of a transformation and augmentation unit.

FIG. 2 shows an example of a transformation and augmentation unit 120. A task analyzer 1200 analyzes media input content from the media manager 106 to determine what service is being requested. The task analyzer 1200 passes characterized type of service information to a task splitter 1202, which distills the content into its components, e.g., audio for transcription and, audio and text alignment. In another example the task splitter 1202 may separate transcription components into speech recognition and error editing components. Further, the task splitter 1202 may define task components for determining accuracy of the audio transcription from the type of audio, the source, the desired service, and the best method for transcription. A pathfinder 1204 or auctioning distribution unit defines individual paths for each of the components so that the paths and components can be sent to their respective providers. A switch control 1206 selectively switches from one type of service to another, e.g., from manual transcription to speech recognition transcription. The pathfinder 1204 then sends the path and component information to a task component router 1208 with information regarding how much each path option may cost, thereby allowing the task component router 1208 to find the most efficient path. The task component router 1206 forwards the result to the auction manager 124, preferred service providers 122 and/or background training 132.

The service requested may include, for example, audio indexing, real-time transcription, offline transcription of a webcast, description of video/graphic information for visually impaired persons, text passage simplification for a user with learning disabilities. Many webcasts contain audio in compressed formats, e.g., Quicktime, RealPlayer or motion picture experts group layer 3 (mp3) format, that achieve smaller file size at the cost of reduced audio quality and, as a consequence, somewhat degraded decoding accuracy. Accordingly, convertibility is insured for on-demand accessibility by promulgating webcast audio standards that direct webcast creators to supply links to original webcast audio. Original audio may be stored in any suitable format for reproducing high quality audio for error free or near error free automatic speech recognition. So, original audio may be stored as: uncompressed, raw audio, e.g., a wave file; a low loss compressed format; a preprocessed format such as cepstra, which is obtained using Fast Fourier Transform (FFT) and derivatives thereof based signal processing; or any other suitable low loss format that provides high quality audio input for ASR, e.g., that can be combined with webcast audio to reproduce high quality audio for ASR with a suitably low recognition error rate. Thus, providing the speech decoder with access to the original audio rather than low quality compressed audio, significantly increases recognition accuracy. In some special cases, for example, webcast creators are advised to use camera-mounted microphones that capture lip movements while they speak and provide video data for audio visual decoding. Video data of lip movement is especially useful for recordings done in a noisy environment.

Figure 3:
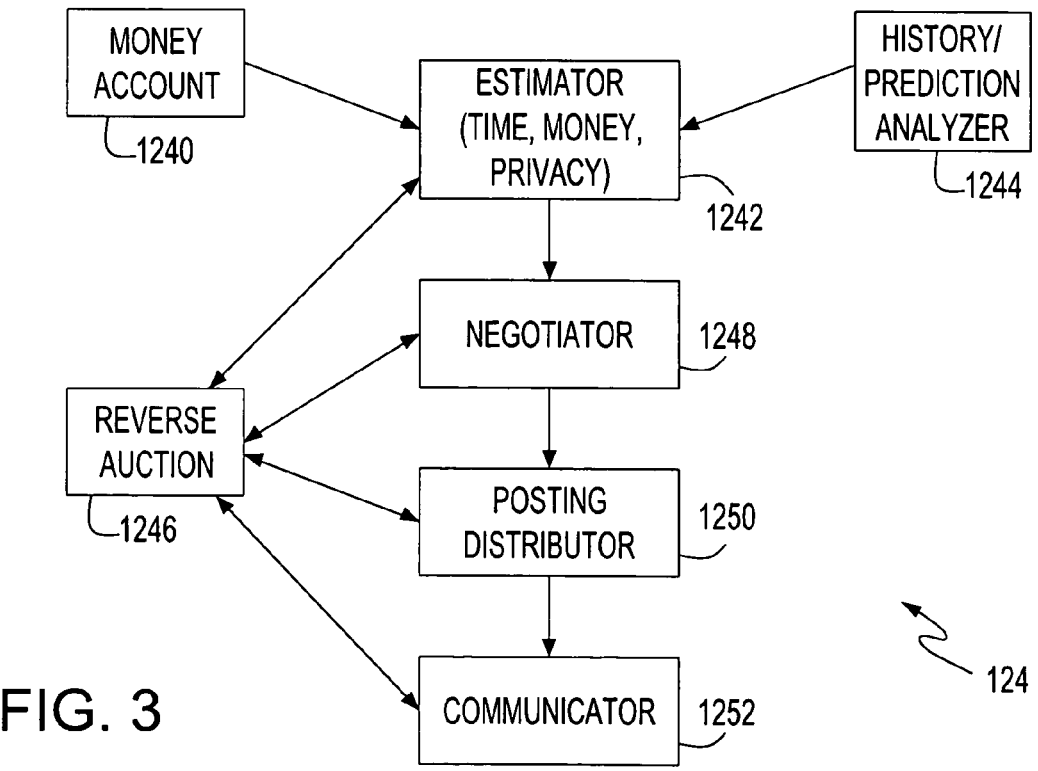
FIG. 3 shows an example of an auction manager.

FIG. 3 shows an example of an auction manager 124. In this example, the auction manger 124 includes a pooled money account 1240 from which the various service providers may be paid and that provides a clear indication of how much money is available to pay for a given service. An estimator 1242 estimates a variety of factors and resources related to the conversion. Examples of conversion factors may include: how much time is necessary to fulfill a given service, available financial resources, the required cost of a given service (cost based on past expenses), and factors concerning privacy and confidentiality requirements specified by the user. A history/prediction analyzer 1244 contains data from previous estimates and receives feedback from the estimator 1242 regarding the estimate reliability, facilitating accurate estimates. A reverse auction module 1246 defines the particular selected auction method employed, e.g., English auction, Dutch auction, double auction and etc. The reverse auction 1246 in combination with estimator 1242 manages the auction in arriving at an optimum balance of auction goals. Preferred auction goals include minimum conversion price and maximum conversion pipe, i.e., the distribution of conversion tasks across the bradest range of conversion activities. Such conversion activities may include, for example, digitizing audio, transcribing, editing, aligning and so forth. A Negotiator 1248 compares different bids at auction by service providers against estimates from estimator 1242. The negotiator 1248 also forwards information service providers may need for selecting bids for a given service request and resolves any conflicts regarding service provider specifics of providing the service. For example, the negotiator 1248 may resolve the situation or variance where a provider is willing to provide the service at a very cheap price, in exchange for an extended amount of time to provide it. The negotiator 1248 negotiates compromises for both sides of an issue and can negotiate to reach settlements with live persons and/or other automatic negotiating systems. A posting distributor 1250 returns information to the negotiator 1248 about the services requested, the cost of the services, status of the services, and access to available tools. A communication module 1252 communicates with bidders, e.g., over a network, with phones, client servers or with other communication systems.

Figure 4:
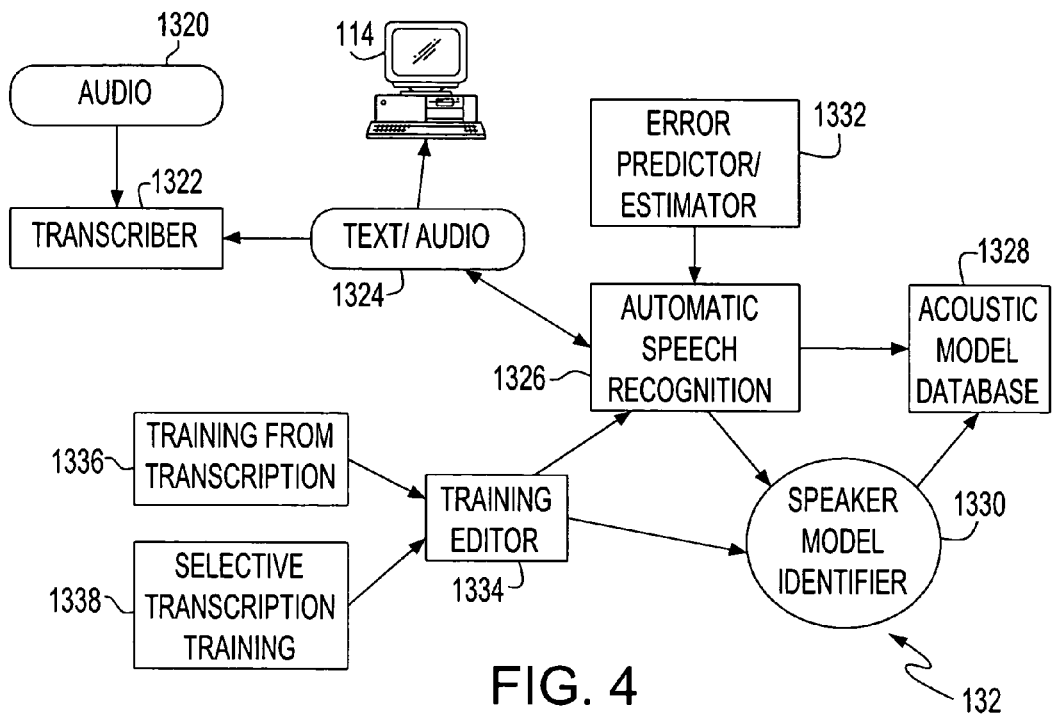
FIG. 4 shows an example of the background training unit.

FIG. 4 shows an example of operation of the background training 132. The transformation and augmentation unit or a preferred service provider (120 and 122 in FIG. 1, respectively) provide audio files 1320 to a transcriber 1322. Text and audio 1324 from transcriber 1322 is provided to a customer, e.g., at a computer monitor 114. In addition, the text and audio 1324 may be passed to automatic media conversion, automatic speech recognition (ASR) 1326 in this example, for training a new acoustic model or updating a previously developed model. Acoustic models are stored in an acoustic model database 1328. A speaker model identifier 1330 identifies whether each acoustic model developed by ASR 1326 resembles any previously developed model in acoustic model database 1328 or, if it is a new acoustic model. Speaker identification technology can be reused to identify frequently recurring speakers (e.g., speeches produced by the President). Once identified, acoustic models corresponding to that speaker can be invoked, so that the remainder of the speech may be transcribed automatically. An error estimator/predictor 1332 predicts when an error is expected to occur and passes to switch control (1206 in FIG. 2) in the transformation and augmentation unit 120 and, before submission to the path finder 1204, facilitates determining whether automatic speech recognition is sufficient or manual conversion is needed. A training editor 1334 receives training data from full transcription 1336 or selective/partial transcription 1338.

Error estimator/predictor 1332 may use well known confidence scoring algorithms to detect confusable words in speech decoding. Word recognition includes a "confidence score" reflecting the likelihood that the correct word was chosen. Words with a low confidence score can be displayed in different colors, for example or as strings of phonemes. Further, an audio-quality analyzer may be used to determine an expected decoding accuracy of a stored audio and suggest whether the audio be routed to fully automated speech recognition, or whether it should be transcribed through other means, such as a shadowing process or manual transcribers.

Full transcription may be done, for example, by a stenographer with good audio association. Selective/partial transcription 1336 may be done, for example, by a relay service operator, e.g., a regular typist that is slower than a stenographer and may miss a number of words. The confidence scorer can increase efficiency of the editing process. Audio segments with low confidence scores can be detected and marked. The training editor 1334 edits any suspected transcription errors in whatever portion is transcribed, e.g., interactively by the transcriber or, preferably, using unsupervised training that is less dependent on text information or only on partial information from text. The editing can be distributed to multiple editors, each paying attention primarily to passages with words having low confidence scores rather than playing the whole audio file in the editing process. The editors, working at different terminals can make corrections, and the corrected words can then be re-integrated back into the decoded stream for a more cost efficient and timely transcription. Each edited transcription is then used to train the ASR unit 1326. Background training allows creation of acoustic models 1328 of a speaker's voice without a session with the speaker explicitly training the speech recognizer. Typical background training, e.g., ViaVoice from IBM Corporation, can be used for situations where the same speaker has created multiple samples of audio.

Thus, human-mediated transcription (stenography, or shadowing) 1336, 1338 can be used to generate text in initial phases. The corrected transcriptions are used to create acoustic models 1328 of a particular speaker. Once the particular acoustic model 1328 is sufficiently robust, automatic speech recognition 1326 can seamlessly replace the human-mediated transcription methods. So, for selective/partial transcription 1336, the same training and editing is done on the parts of a transcription. Thus, training accuracy is improved with mistake recognition and editing until editing is no longer or seldom necessary.

Figure 5A:
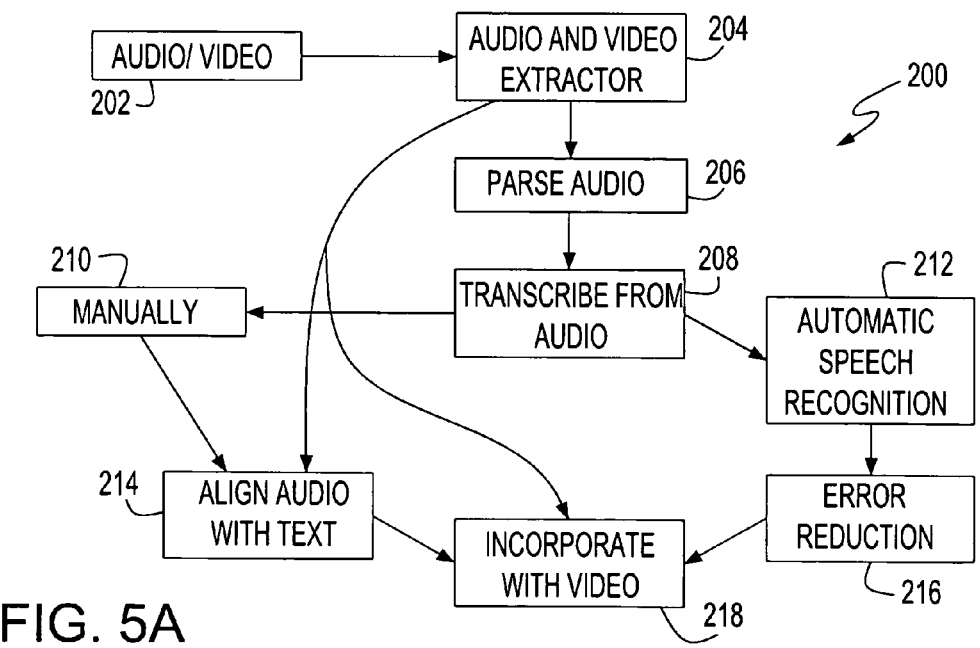
FIG. 5A shows path examples from a task splitter.

FIG. 5A shows path examples 200 managed by a task splitter 1202 of FIG. 2. Media input, e.g., audio/video (A/V) input 202, is passed to an A/V component extractor 204 that separates audio from video. Extracting A/V components provides smaller more compact files that are easily transported, e.g., over the Internet, even to distant service providers (e.g., in India) with older, less powerful systems. Audio files in particular may be shrunk significantly and so, more easily transferred. Further compression may be used in a parser 206, e.g., a mp3 ripper, to further reduce audio data volume. For example, about 20 minutes of spoken word can be compressed from as large as 200 megabytes (200 MB) to about 1 MB or less using typical such reduction, although with somewhat degraded audio. However, these smaller files may be sent as e-mail attachments to providers that may not have access to FTP services or may have service limitations, e.g., an upper limit on incoming file sizes or inbox size, e.g., $\leq 10$ MB. An audio transcription selector 208, e.g., in the auction manager 124 of FIG. 1, selects an appropriate transcription technique based on previously defined parameters to produce a text output file. Transcription can be done manually 210, e.g., by a stenographer or, automatically 212 using any suitable well known techniques. If manual transcription 210 is selected, then the text output file is sent for audio alignment 214 using high quality (raw, unparsed) audio from extractor 204. If automatic transcription is selected, e.g., in ASR 132 of FIG. 4, the text output file (which is aligned automatically in ASR) is forwarded for error reduction 216, e.g., editing interactively by a unskilled individual. The completed transcription file, either from audio alignment 214 or from error reduction 216 is passed to text/video unit 218 where it is recombined with the video from A/V component extractor 204, reintegrating it with video. Different services, tasks and providers have different associated costs and scheduled completion times for accomplishing a given request. Thus, each task must also have an attached cost and time efficiency as selected by the user to facilitate selecting the most efficient path.

Figure 5B:
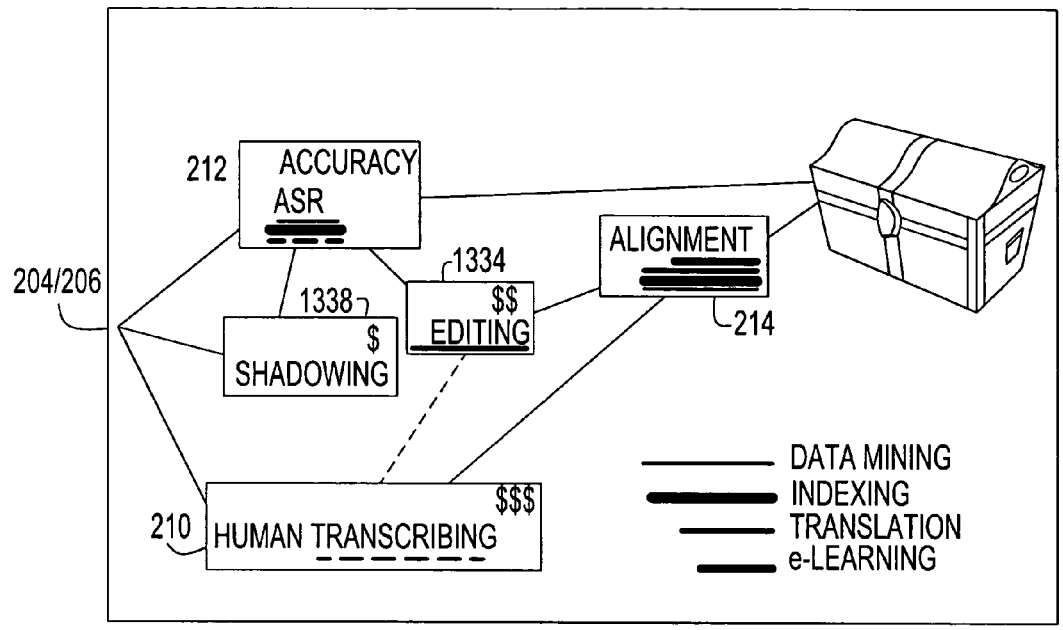
FIG. 5B shows process flow with allowance for automatically redirecting media streams through various technological steps based on price, quality, time and other requirements.

FIG. 5B shows process flow with allowance for automatically redirecting media streams through various technological steps based on price, quality, time and other requirements. For example, transcription data may be assigned a specific route depending whether data mining (e.g., manual transcription 210, ASR 212 and alignment 214) is required in the conversion. Alternately, the transcription data may be used in e-Learning (alignment 214), indexing (ASR 212 and alignment 214) or translation (ASR 212, alignment 214 and editing 1334). Route finding techniques similar to those used in assigning a route to a traveling salesman or in route optimization are scaled to accommodate various providers of the specific services, their schedules, pricing and for any other pertinent factors.

So, for example, in response to selecting the Caption Me Now button to initiate captioning on demand, audio is transcribed, the transcription synchronized with the audio, and re-integrated into the appropriate multimedia format, which is provided for the customer, cost effectively and on schedule. Automated audio transcription may be enhanced by porting to state of the art ASR, e.g., SuperHuman speech recognition from IBM Corporation. First standards are established for what qualifies as automatically transcribable audio for guiding content creators in providing audio content for automated decoding algorithms, e.g., using lip microphones with noise suppression. Ultimately, speech recognition accuracy depends, to a large part, upon careful speech data creation.

However, when the audio data or speech quality does not meet the threshold, it is semi-automatically transcribed using one or more of a number of the automation tools that rapidly provide the requested materials. The audio can be sent to a "shadowing" facility, for re-dictation using standards recommended for inputting speech. A real-time editing capability can ensure an accurate, high quality transcript output. Alternatively, stenography pools can be tapped in real-time, including using lower-cost, real-time editors where appropriate. Also, transcriptions for frequently-occurring speakers are provided through shadowing or stenography and can serve to bootstrap fully automated captions. These transcriptions provide backchannel "training data" for acoustic models for each particular speaker. Automated speech recognition can be run simultaneously with manual transcription. When the speech recognition accuracy reaches some pre-determined threshold, e.g., 85%, live transcription can be replaced with ASR, supplemented by low-cost real-time editing. The automatic alignment of text with audio is enhanced to create multimedia captions. So, even flat transcriptions created through stenography are quickly re-incorporated as synchronized captions in the appropriate multimedia format.

Figure 6:
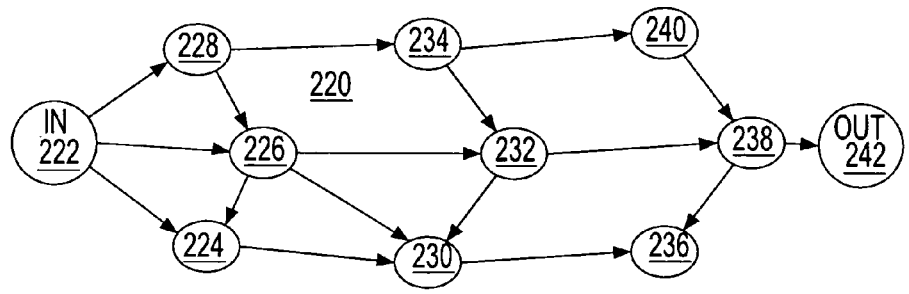
FIG. 6 shows an example of path finder operation on a network from an originating node over a number of network nodes to an end node.

FIG. 6 shows an example of a network 220 with components sent from an originating node 222 over a path selected by the path finder (1204 in FIG. 2) from a number of network nodes 222, 224, 226, 228, 230, 232, 234, 236, 238, 240 to exit as converted data at an end node 242. Each network node 222, 224, 226, 228, 230, 232, 234, 236, 238, 240 is associated with tasks, resources, and costs. Some nodes may be temporarily or periodically active or inactive and, therefore all of the network nodes 222, 224, 226, 228, 230, 232, 234, 236, 238, 240 have a probability as to when it would be active. Further, each network node 222, 224, 226, 228, 230, 232, 234, 236, 238, 240 has a probability of failure to complete a particular task associated with it. Since any given network node 222, 224, 226, 228, 230, 232, 234, 236, 238, 240 may fail to complete a particular task, the network 220 includes redundancy with nodes capable of duplicating tasks, e.g., if node 234 fails to complete a task, the task responsibility may be handed off another.

The path finder (1204 in FIG. 2), which may be any suitable network graph analysis and path finding module, communicates with the negotiator (1246 in FIG. 3) though the task component router (1206 in FIG. 2). When the negotiator 1246 receives new or updated information, the path finder 1204 updates the network graph, e.g., 220. Therefore, the information associated with the network graph 220 is dynamic. Further, the switch control (1206 in FIG. 2) manages switching from one node to another if the other node is better suited for a particular task, e.g., the other node has speech recognition that may operate as a transcriber.

So, indicating pathways between nodes by arrows for the example of FIG. 6, designated herein by a starting and ending node, e.g., 222-226, network paths can be described. There are a number of paths between input node 222 and end node 242, e.g., 222-226-232-238-242, or 222-228-234-236-238-242. Essentially, data enters input node 222, traverses the network 220 and exits end node 242. At each intervening network node 222, 224, 226, 228, 230, 232, 234, 236, 238, 240, information regarding cost, time and other parameters is added to the data. Further, because of the potential for failure, the cheapest path may have a high failure risk, yet because of potential redundancy, a more expensive path may be more likely to complete successfully. Thus, each unique path has an unique cost, time and likelihood of success associated with it.

Figure 7:
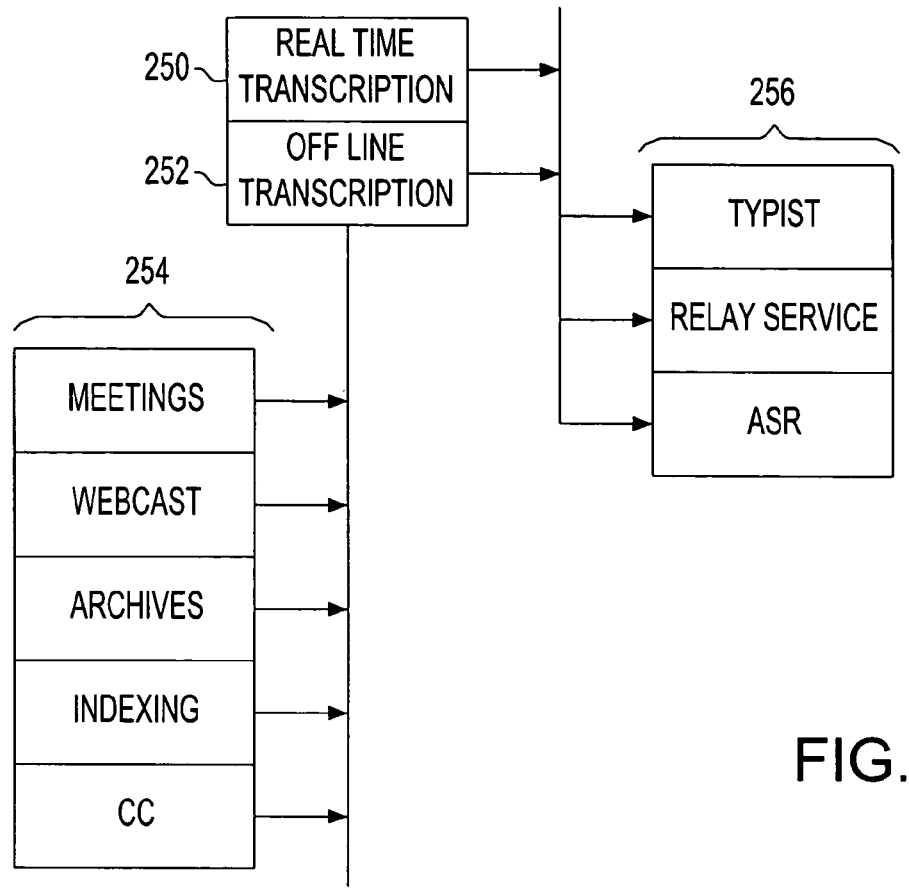
FIG. 7 shows transcription services examples, both real time transcription and off-line transcription.

FIG. 7 shows transcription services examples, both real time transcription 250 and off-line transcription 252. Transcription source requests 254 include meetings, web casts, library archives, indexing, or multimedia (e.g., closed captioning movies). Transcription services 256 include using a stenographer, a regular typist, a relay service operator, or automatic speech recognition. The task analyzer, e.g., 1200 in FIG. 2, receives a request from one of the sources 154. The task component router 1208 selects real time transcription 250 or off line transcription 252. Depending upon that selection and the maturity of the speaker model (1328 in FIG. 4), the appropriate service is selected.

Figure 8:
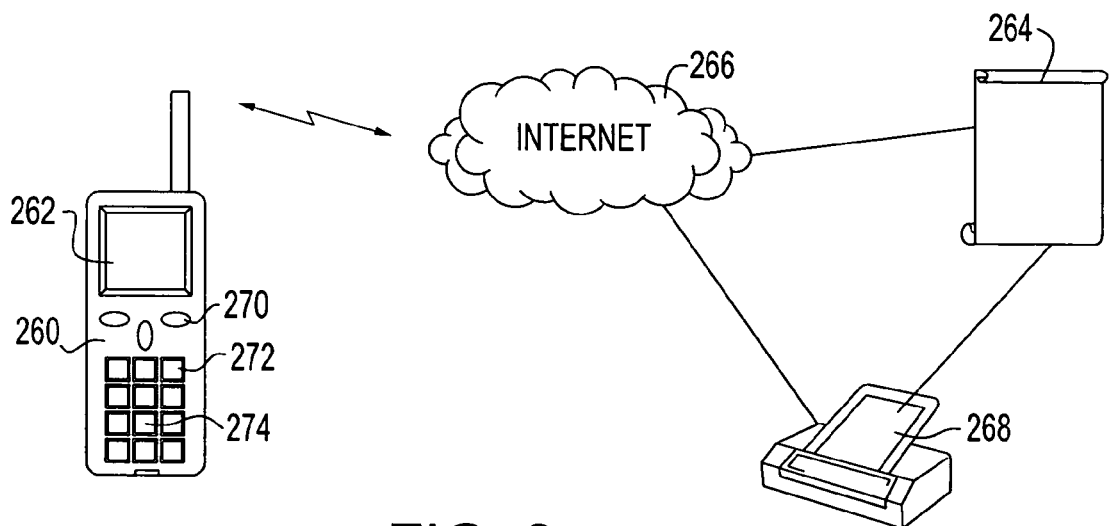
FIG. 8 shows an example of application of the present invention to providing transcription is done utilizing a cell phone for textual on screen responses to voice based communications.

FIG. 8 shows an example of application of the present invention to providing transcription over a cellular telephone (cell phone) 260, e.g., for textual on screen 262 responses to voice based communications. In this example, the cell phone 260 is in communication with a presentation location 264, e.g., over the Internet 266. Further, the presentation location 264 is in communication with a presentation service 268 (e.g., 256 in FIG. 7) converting a presentation at the presentation location 264, converting the presentation material to text, audio, video, or any combination of thereof. In this example, the form of the presentation provided by the cell phone 260 is selected by selecting a designated or dedicated buttons 270, 272, 274. So, a button 270 may be designated as an audio button, another button 272 may be designated a video button and, yet another button 270 may be designated as a transcription button. A user may select transcription by touching the transcription button 272 for text to be displayed on the screen 262, coincidentally, allowing for easier transmission with smaller file sizes. The user can select the audio button 270 to listen to audio. Alternately, the user can select the video button 272 to see video associated with presentation or images of the speaker(s). So, from time to time during the presentation, the user may switch between text, untranscribed audio and video and back.

Accordingly, the present invention provides real-time accessibility services that includes transcription of input from a server telephone and that can send digitally compressed audio. Digitally compressed audio received from a cell phone can be converted in real-time, sending audio data to speech recognition that is capable of processing compressed audio. Alternately, for normal un-compressed speech, the quality of the audio input is quickly assessed. If the input is at least moderate quality audio and primarily speech from a person for whom a speech model already exists, the audio input is forwarded to speech recognition software that is capable of directly decoding and transcribing the telephone audio. If audio quality is poor, the audio input is forwarded to a stenographer for real-time transcription, selecting the least expensive qualified stenographer among a group of qualified stenographers. Simultaneously, the speaker's audio and the stenographer's transcription are compared to non-intrusively train speech recognition software for future use. Once training results in an acceptable speaker model, if and whenever audio input is provided from the same speaker, lower cost speech recognition can be used rather than resorting to a more expensive stenographer. Advantageously, the transformation and augmentation unit automatically identifies when to switch from stenographer to speech recognition to reduce conversion cost.

The present invention has application to most accessibility conversion applications. For example, a company may need audio transcribed for indexing to allow for searching. Generally, speech recognition accuracy is acceptable for searching and indexing. Thus, the transformation and augmentation unit may respond to a request for audio transcription by sending the audio input for indexing and transcription by a fast but moderately accurate speech recognition. If the accuracy for a given transcription is unacceptable, the transformation and augmentation unit may send the transcription to a higher accuracy speech recognition or, if necessary, to a stenographer. Thus, a combination of different types of conversion, e.g., either speech recognition or, stenographer, are selectable for the task at hand.

Advantageously, accessibility services are available as required, i.e., on-demand in an auction-like resource selection minimizes cost by selecting the cheapest provider. The transformation and augmentation unit distributes the work of converting a single job, e.g., a web cast. as several components, e.g., audio, video and displays. Resources are selected from a variety of tools that may each realize different components of the overall accessibility goal. Furthermore, components assignment is optimized for cost efficiency including what is completed by whom, when and how, choosing between manual services (e.g., a stenographer) and intelligent services (e.g., speech recognition software). Once each job is completed, the components are reintegrated into a final product. Manual services may be utilized in simultaneously conducting an incremental training of the intelligent services, e.g., a speech recognition system, a translation system, an object/graphic identification and description system, or an automatic summarizing/clarifying system. Audio, for example, may be provided from any suitable source, e.g., compressed from a PDA, from a telephone speech, or from a microphone, each providing audio of varying levels of accuracy (cost). Audio may be compressed audio, low quality speech, or raw audio from a microphone. Further, background training is transparent seamlessly switching between a variety of intelligent services such as speech recognition, summarization, and translation.

While the invention has been described in terms of preferred embodiments, those skilled in the art will recognize that the invention can be practiced with modification within the spirit and scope of the appended claims.

What is claimed is:

1. A computer program product for providing accessibility services on demand, said computer program product comprising a computer usable medium having computer readable program code stored thereon, said computer readable program code comprising:

computer readable program code means for receiving media content in a pre-existing content format;

computer readable program code means for extracting conversion information from received said media content, extracted said information including a type of conversion from said pre-existing content format to a selected accessible format, said selected accessible format providing accessibility to said media by individuals not having accessibility in said pre-existing content format;

computer readable program code means for distributing extracted said information to a plurality of prospective service providers;

computer readable program code means for requesting quotes from said plurality of prospective service providers and receiving bids for converting received selected media content responsive to said distributed extracted information and requests for said quotes;

computer readable program code means for identifying service providers for conversion responsive to received said bids from said plurality of prospective service providers; and computer readable program code means for training automatic conversion of said selected media content being converted by identified said service providers;

wherein the computer readable program code means for extracting conversion information comprises:

computer readable program code means for analyzing said media content and determining a conversion type being requested;

computer readable program code means for distilling said media content into content components responsive to a determined said type of conversion;

computer readable program code means for finding paths to said prospective service providers for each of said content components responsive to said determined type of conversion; and computer readable program code means for selecting a most efficient path among said paths for said each of said content components.

2. A computer program product for providing accessibility services on demand as in claim 1, wherein said computer readable program code means for requesting quotes comprises:

computer readable program code means for providing estimates of conversion related factors;

computer readable program code means for retaining previous said estimates and adjusting said previous estimates responsive to feedback regarding reliability of said previous estimates;

computer readable program code means for requesting bids for services from prospective service providers, comparing received said bids with said estimates and resolving conflicts with said prospective service providers;

computer readable program code means for maintaining information and distributing maintained said information about said requested services; and computer readable program code means for communicating requests for bids to said prospective service providers and receiving prospective service providers bid.

3. A computer program product for providing accessibility services on demand as in claim 2, wherein said computer readable program code means for training automatic conversion comprises:
   computer readable program code means for maintaining a media content model database containing models for previously converted media content;
   computer readable program code means for identifying content in said media content originating from a source in common with a content model in said content model database; and
   computer readable program code means for automatically converting media content based on the common said content model.

4. A computer program product for providing accessibility services on demand as in claim 3, said computer readable program code means for training automatic conversion further comprising:
   computer readable program code means for determining the likelihood of errors in an automatic conversion of said media content; and
   computer readable program code means for switching between automatic conversion and manual conversion responsive to said likelihood of errors, media content having said likelihood of errors below said threshold being automatically converted and media content having said likelihood of errors below said threshold being sent for manual conversion.

5. A computer program product for providing accessibility services on demand as in claim 4, wherein said media content is multimedia including audio being converted to text, said automatic conversion is an automatic speech recognition and said media content model database is an acoustic model database.

6. A computer program product for providing accessibility services on demand as in claim 5, wherein said computer readable program code means for identifying service providers comprises:
   computer readable program code means for accessing a money account containing pooled money available for paying said service providers and said computer readable program code means for selecting said most efficient path selects said most efficient path responsive to an account balance of said money account.

7. A computer program product for providing accessibility services on demand as in claim 1, further comprising:
   computer readable program code means for providing a caption me now link on participating web pages.

8. A method of providing accessibility services on demand comprising the steps of:
   a) receiving media content in a pre-existing content format;
   b) extracting conversion information from received said media content, extracted said information including a type of conversion from said pre-existing content format to a selected accessible format, said selected accessible format providing accessibility to said media by individuals not having accessibility in said pre-existing content format;
   c) distributing extracted said conversion information with a request for bids to a plurality of prospective service providers;
   d) receiving bids for converting received selected media content from said plurality of prospective service providers;
   e) identifying by a transformation and augmentation unit service providers for conversion responsive to received said bids from said plurality of prospective service providers; and
   f) distributing said selected media content to identified said service providers for conversion;
   wherein step (b) of extracting conversion information comprises the steps of:
   analyzing said media content and determining a conversion type being requested;
   distilling said media content into content components and conversion related factors responsive to a determined said type of conversion; and
   wherein the step (e) of identifying service providers comprises the steps of:
   finding paths to said prospective service providers for each of said content components responsive to said determined type of conversion;
   selecting a most efficient path among said paths for said each of said content components, said most efficient path being the path having the highest likelihood of completion for the lowest cost;

9. A method of providing accessibility services on demand as in claim 8, before the step (a) of receiving media content further comprising the steps of:
   a1) defining media content format for content providers, defined said media content format facilitating conversion to other content formats; and
   a2) providing media content in said defined media content format.

10. A method of providing accessibility services on demand as in claim 9, wherein provided said media content is streaming content from a webcast and the step (a) of receiving media content is initiated by selecting a web page link.

11. A method of providing accessibility services on demand as in claim 8, wherein a database of previous estimates is being maintained and the step (b) of extracting conversion information further comprises the step of:
   i) providing estimates responsive to said conversion related factors.

12. A method of providing accessibility services on demand as in claim 11, wherein the step (d) of receiving bids comprises the steps of:
   i) distributing said conversion factors to prospective service providers;
   ii) requesting bids for services from said prospective service providers; and
   iii) receiving service provider received bids.

13. A method of providing accessibility services on demand as in claim 12, wherein the step (e) of identifying service providers further comprises the steps of:
   i) comparing said service provider bids with said estimates;
   ii) resolving conflicts with said prospective service providers; and
   iii) adjusting said previous estimates in said database responsive to feedback regarding reliability of said previous estimates.

14. A method of providing accessibility services on demand as in claim 13, wherein said database is a media content model database containing models for previously converted media content and the step (f) of distributing said selected media content comprises the steps of:
   i) identifying whether content in said media content originates from a source in common with a content model in said content model database;
   ii) determining the likelihood of errors in an automatic conversion of said media content; and iii) switching between automatic conversion and manual conversion responsive to said likelihood of errors, media content having said likelihood of errors below said threshold being automatically converted based on the common said content model and media content having said likelihood of errors below said threshold being sent for manual conversion.

15. A method of providing accessibility services on demand as in claim 13, wherein the step (e)(iv) of selecting said most efficient path comprises accessing a money account containing pooled money available for paying said service providers and said most efficient path being selected responsive to an account balance of said money account.

16. A method of providing accessibility services on demand as in claim 15, wherein said media content is multimedia including audio being converted to text, said automatic conversion is an automatic speech recognition, said media content model database is an acoustic model database and said multimedia is received responsive to selection of a link on a webpage linked to said multimedia.

* * * * *